UNITED STATES PATENT OFFICE.

ALBERT P. TSCHIRNER, OF ST. LOUIS, MISSOURI.

DENTAL CEMENT.

SPECIFICATION forming part of Letters Patent No. 636,367, dated November 7, 1899.

Application filed June 21, 1899. Serial No. 721,306. (No specimens.)

*To all whom it may concern:*

Be it known that I, ALBERT P. TSCHIRNER, a citizen of the United States, residing at the city of St. Louis, State of Missouri, have invented a certain new and useful Improvement in Dental Cement, of which the following is a full, clear, and exact description, such as will enable others skilled in the art to which it appertains to make and use the same.

It is well known that zinc-phosphate dental cements contain more or less glycerin, which is added for the purpose of obtaining a plastic workable mass and to lessen the quick action of the phosphoric acid on the oxid of zinc. As these glycerin compounds are very unstable, being unable to withstand the action of the saliva, it has been desirable to obtain a filling material avoiding the use of glycerin or any soluble foreign substance which would deteriorate or waste away in the mouth.

It is the object of my present invention to produce an insoluble phosphate-of-zinc cement in which no glycerin or any other soluble substance is used.

My invention consists in a liquid compound the base of which is an acid phosphate of zinc combined with a powder consisting mainly of oxid of zinc, with other basic oxids added in various proportions for the purpose of adapting my cement to the various operations required in dentistry.

In carrying out my invention I have found the following formulas to answer admirably; but it is obvious that the proportions given can be changed and the ingredients also changed without in the least departing from the nature and principle of my invention.

In a fluid ounce of phosphoric acid, having approximately a specific gravity of 1.69, I dissolve one hundred and sixty grains of oxid of zinc and then add two drams of aqua-ammonia, after which the liquid is evaporated to a density of about 1.945. The powder to be used in conjunction with the above liquid is composed of four parts of oxid of zinc, six parts of oxid of tin, and two parts of oxid of aluminium.

To use the cement, a desired quantity of powder is made plastic by the liquid compound, as is well understood.

Another illustration of my invention is as follows: In a fluid ounce of phosphoric acid (specific gravity, 1.69) I dissolve one hundred and twenty grains of oxid of zinc and forty grains of oxid of aluminium. The powder to be used in conjunction with this compound is composed of four grains of oxid of zinc and six grains of oxid of tin.

In the last-mentioned formula the aluminium is introduced into the liquid compound instead of the powder, as stated in the first illustration. In both illustrations it will be noticed that the cement is formed of insoluble basic phosphates free of any substance soluble in water, such as glycerin, gelatin, or other similar substances.

It will be noticed that in the above two formulas both contain liquid and powder constituents. The liquid constituents of the first formula are composed of phosphoric acid and oxid of zinc, the ammonia being introduced to form a union between the two and prevent hardening of the zinc, so that the phosphate of zinc will remain liquid for a long time. The powder constituent in this first-mentioned formula containing the oxids of zinc, tin, and aluminium is thoroughly mixed before the liquid is added to it, and after the addition of the liquid the basic phosphates are formed and, being of the proper proportion, will harden slowly, giving the operator ample time to manipulate it before the hardening process is completed. In the last-mentioned formula the liquid constituents contain the oxid of aluminium in addition to the other ingredients, and the powder constituent the oxids of zinc and tin. In this formula the aluminium is merely transferred from the powder to the liquid constituent, the proportion of the parts being substantially the same.

My cement has the following advantages: It is a perfect chemical compound composed solely of insoluble basic phosphates free of any substances which are soluble in water, permanently insoluble, has a high degree of density and hardness, is a non-conductor of heat and therefore avoids irritation of the dental nerve, and is readily adaptable to the tooth-cavity, thereby insuring the exclusion of moisture and bacteria.

Having thus described my invention, what I claim, and desire to secure by Letters Patent, is—

1. The herein-described dental cement composed of liquid and powder constituents, said constituents being made of phosphoric acid, ammonia, and metallic oxids, such as zinc, tin, and aluminium; substantially as described.

2. A slow-hardening cement free from substances soluble in water, the same consisting, when hardened, of insoluble phosphates of zinc, tin, and aluminium; substantially as described.

In testimony whereof I hereunto affix my signature, in the presence of two witnesses, this 19th day of June, 1899.

ALBERT P. TSCHIRNER.

Witnesses:
F. R. CORNWALL,
A. S. GRAY.